United States Patent [19]

Ahn et al.

[11] Patent Number: 4,578,788
[45] Date of Patent: Mar. 25, 1986

[54] HIGH PERFORMANCE OPTICAL STORAGE MEDIUM WITH SEPARATE MECHANICAL SERVO TRACKS EMBEDDED WITHIN THE MEDIUM

[75] Inventors: Kie Y. Ahn, Chappaqua; Thomas H. DiStefano, Bronxville; Victor B. Jipson, Mahopac, all of N.Y.

[73] Assignee: International Business Machines Corporation, Armonk, N.Y.

[21] Appl. No.: 500,513

[22] Filed: Jun. 2, 1983

[51] Int. Cl.[4] .............................................. G11B 7/24
[52] U.S. Cl. ..................................... 369/275; 369/94; 369/111; 369/279; 369/284; 369/286; 346/76 L; 346/135.1
[58] Field of Search ................. 369/94, 100, 111, 275, 369/284, 286, 277, 278, 279, 44; 346/76 L, 135.1, 137

[56] References Cited

U.S. PATENT DOCUMENTS

| | | | |
|---|---|---|---|
| 4,000,492 | 4/1974 | Willens | 346/76 L |
| 4,175,145 | 11/1979 | Fechter | 346/135.1 |
| 4,285,056 | 8/1981 | Bell | 369/275 |
| 4,318,112 | 3/1982 | Kivits | 369/275 |
| 4,325,135 | 4/1982 | Dil | 369/94 |
| 4,389,719 | 6/1983 | Donk | 369/275 |
| 4,450,553 | 5/1984 | Holster | 369/275 |
| 4,451,914 | 5/1984 | LaBudde | 346/135.1 |
| 4,481,620 | 11/1984 | Murakami | 369/275 |

FOREIGN PATENT DOCUMENTS 33430 8/1981 European Pat. Off. .

OTHER PUBLICATIONS

"Servo Disk with Overlapping Servo & Data Tracks" by Comstock et al., IBM Tech. Disc. Bull., vol. 16, No. 6, Nov. 1973, p. 1818.
Robbins, Freese, Smith and Wilson, paper #THL2, "Bubble Forming Media for Optical Recording: a new approach", Cleo 1981, D.C., 6/10-12, 1981.

Primary Examiner—Alan Faber
Attorney, Agent, or Firm—Graham S. Jones, II

[57] ABSTRACT

An optical storage medium incorporates stacked servo and data layers with the pattern of the servo layer being prepared prior to preparation of the data layer. The servo pattern comprises an undulation in a very thin film of high optical index material on the surface of the substrate of the medium. The undulating layer containing the servo pattern is separated from the active layer of the medium by a thin dielectric spacer film. The data layer is employed for formation of vesicular, or ablative or other marks forming surface discontinuities formed by any of the usual pit forming techniques. The preformatted servo information formed in the servo layer as buried undulations in the thin film is read out in amplitude or phase contrast. The thin undulating layer is of a significantly different index of refraction from the substrate and the next intervening layer. This layer can be transparent or semi-transparent. A smoothing layer is then applied over the phase-contrast layer to reduce any undulations at the top surface on which the active layer is formed. The amount of energy absorbed by the active layer of the structure is optimized for the data recording wavelength by choice of thickness of the smoothing layer.

14 Claims, 3 Drawing Figures

HIGH PERFORMANCE OPTICAL STORAGE MEDIUM WITH SEPARATE MECHANICAL SERVO TRACKS EMBEDDED WITHIN THE MEDIUM

BACKGROUND OF THE INVENTION

1. Field of the Invention

The present invention relates to optical storage media and more particularly to servo tracks incorporated into the structure of a multilayer optical storage medium adapted for vesicular storage of data written by optical techniques.

2. Description of Related Art

U.S. Pat. No. 4,285,056 dated Aug. 18, 1981 of Bell for "Replicable Optical Recording Medium" shows a multilayer stack of Al, $MgF_2$ and Ti as reflective, transmissive and reflective layers respectively. These form markings when the $MgF_2$ vaporizes under the laser-heated Ti layer. No servo marks are provided, or suggested by the reference, which would allow an optical beam to detect and to follow predetermined tracks on the medium before data is written upon it.

U.S. Pat. No. 4,318,112 dated Mar. 2, 1982, of Kivits et al for "Optical Recording Disc" describes an optical storage medium which shows holes indicating data formed by ablation of a thin optically absorbing film. The holes are located along depressed servo tracks. FIGS. 3-5 of that patent show a servo track 16, a recording layer 18, a hole 20 formed by a laser beam and an annular ridge portion 21 of recording material 18 originating from the hole 20. Thus, the servo data that allows an optical beam to follow an unrecorded track is formed by grooving the surface of the medium 18 with the ridges 16 forming the servo tracks.

By contrast, it is an object of the present invention to eliminate the grooves on the exterior surface of the medium, thereby providing a medium with a substantially smooth exterior surface.

U.S. Pat. No. 4,175,145 of Fechter dated Nov. 20, 1979 for "Making Memory Structure for Laser Recording System" shows the use of layer 46 (FIG. 5 of that patent) to eliminate the effects of variations 47 and 48 in the substrate. The depressions 47 and protrusions 48 are defects in the surface of the substrate which are smoothed out. This pertains to preparation for recording data on a smooth polymeric surface prior to heating the surface with a laser beam to provide deformations representing data. It is an object of the present invention to provide servo tracks, to a medium having such a smooth surface medium, without deforming any of the surface on which the data is recorded for the purpose of producing servo markings on the medium.

European Patent Application No. 0 033 430 A1 published Aug. 12, 1981, for "A Thermal-Optical Process for Inscribing Information and an Information-Bearing Device Designed for the Practical Application of Said Process" shows vesicles formed by a metal film on an organic layer over a transparent substrate. In FIG. 9 of that application, the vesicles are coated with a thick film of a metal to provide long life, after data has been recorded in the form of vesicles.

W. Robbins, R. Freese, T. Smith, and R. Wilson presented paper No. ThL2, "Bubble Forming Media for Optical Recording: a New Approach" at CLEO 1981 in Washington D.C., June 10-12, 1981. It described a bubble forming material for optical storage applications. The basic structure consisted of a gas-evolving polymeric material onto which an absorbing metallic film is deposited. Data is written by heating the metallic film locally with a focussed laser beam. The high temperature produced by the heating causes gas to be evolved from the polymeric material. When the metal and the polymeric material are chosen correctly, the gas causes the metallic film to bubble, thus resulting in a permanent local change in optical properties. It is an object of this invention to provide servo data which is recorded without using any of the surface area to be utilized for forming bubbles.

A problem with the above material is the difficulty encountered in supplying prerecorded information such as sector and track numbers and clock data on the disk. Because of the nature of the writing mechanism employed, and because the absorbing film is quite thin, the surface is required to be planar to achieve a uniform continuous film that does not have localized weak spots that could be caused by the topology of the surface. This requirement precludes incorporation on the bubble forming or vesicular medium of pre-recorded information in the form of pits or grooves which deform the active layer. Such information can be used for tracking purposes as is commonly done with ablative storage media.

SUMMARY OF THE INVENTION

It is an object of the present invention to eliminate the grooves on the exterior surface of a storage medium, thereby providing a medium with a substantially smooth exterior surface.

Another object of this invention is to provide servo tracks in multilayer vesicular media which are written from the substrate side of the structure.

An object of this invention is to provide an optical storage medium with preformatted information in the form of pits on an interior surface in the storage medium without disturbing the planarity of the active data recording surface of the medium with the phase-indicating pits. Thus the active layer surface is flat prior to writing data in the form of deformations such as bubbles, vesicles, or holes.

Another object of this invention is to provide a relatively strong coupling of light to an active layer of the medium which is adapted to record data in response to a writing energy beam.

It is also desired that the resultant optical structures possess high optical efficiency. It is desired that a high proportion of the incident light be absorbed by the layer that is to be affected by the optical writing process, which applies the heat to form vesicles or bubbles or holes on the medium.

Still another object of this invention is to provide a technique of coupling light efficiently to the optically-written layer of an inverted trilayer structure in which the writing/reading light beam impinges on the active layer from the substrate side. This light is incident on the side opposite from the free surface on the active layer where holes or vesicles are to form.

This invention provides a method and means for embedding servo position-information in the form of pits or grooves within an optical disk upon which data is to be written.

In accordance with this invention, an optical storage medium comprises an optically transparent substrate carrying a thin film structure of data storage material adapted to form deformations representing data formed in the thin film data storage layer, with a servo track formed at an interface between the substrate and the structure, the servo track comprising an internal mechanical undulation of the surface of the interface with the mechanical undulations being substantially absent from the surface of the thin film structure in which the deformations are formed, whereby the servo data can be read through the substrate without the servo data substantially affecting the optical image of the deformations on the upper surface of the thin film structure.

Preferably, the substrate is coated with a film having a high optical index of refraction, which in turn is coated with a polymeric film, which in turn is coated with the data storage layer.

Preferably, the data storage film comprises a metallic film.

Preferably, the polymeric film substantially fills the depressions formed by the mechanical undulations.

Preferably, the polymeric film comprises a spacer layer which substantially fills the depressions formed by the mechanical undulations.

Preferably, the polymeric film comprises a dielectric layer.

Further in accordance with this invention, an optical storage medium comprises an optically transparent substrate carrying a thin film layer (13) of optically absorbing material with deformations (15) representing data formed in the thin film layer(13), the substrate (10) being coated with laminated films (19), the laminated films (19) including a conformal thin film (11), a dielectric film (12) and a thin film layer (13) of the absorbing material adapted for forming the deformations (15) between the thin film layer (13) of the absorbing material and the dielectric film (12), the medium including a servo track, the servo track comprising a plurality of mechanical undulations (14) of the surface of the substrate at the interface between the substrate (10) and the laminated films (19) and the mechanical undulations (14) being substantially absent from the surface (17) on which the deformations (15) are formed, whereby the servo data can be read through the substrate (10) without affecting the optical image of the deformations (15) on the upper surface of the thin film layer (13).

Preferably, the substrate (10) is coated with the conformal thin film (11) which has a high optical index of refraction the conformal thin film being coated in turn with the dielectric film comprising a polymeric film (12) and the polymeric film being coated in turn with the thin film layer comprising a metallic film (13).

Preferably, the polymeric film (12) substantially fills the depressions formed by the mechanical undulations (14).

Preferably the polymeric film (12) comprises a spacer layer which substantially fills the depressions formed by the mechanical undulations (14).

Preferably the polymeric film (12) comprises a dielectric layer.

Preferably the substrate (9) is coated with a very thin film (11) less than about 30 nm thick which is coated in turn with a layer of the polymeric film (12) which is coated in turn with the thin film layer (13) of an optically absorbing metallic film.

Still further in accordance with the invention, an optical storage medium includes a substrate carrying an optical storage trilayer configuration on one surface thereof having a high degree of optical efficiency, with the active layer of the optical storage medium being at a free surface, and the substrate acting as a protective cover glass.

Preferably a substrate (10) carries an optical storage trilayer configuration (19) having a high degree of optical efficiency, and including an optically absorbing active layer (13), with the optically absorbing active layer (13) of the optical storage medium being at a free surface, and the substrate (10) acting as a protective cover glass, and a series of layers (11,12,13) included in the trilayer configuration (19) including a high index of refraction material in one layer (11), a dielectric layer (12) and an active layer (13), with the dielectric layer (12) interposed between the substrate (10) and the active layer (13).

The foregoing and other objects, features and advantages of the invention will be apparent from the more particular description of the preferred embodiments of the invention, as illustrated in the accompanying drawings.

BRIEF DESCRIPTION OF THE DRAWINGS

In the drawings, like elements are designated with similar reference numbers, and identical elements in different specific embodiments are designated by identical reference numbers.

DESCRIPTION OF THE PREFERRED EMBODIMENT

Figure 1:
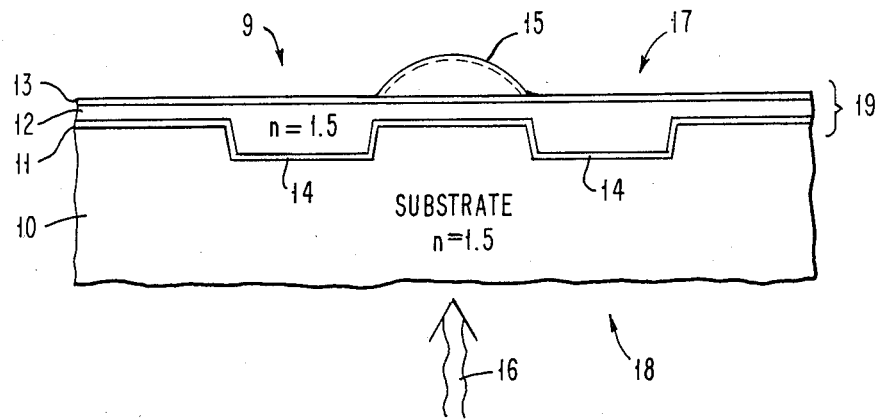
FIG. 1 shows a sectional view of a laminated optical storage medium in accordance with this invention.

FIG. 1 shows a laminated optical storage medium 9 fabricated in accordance with this invention. A disk-shaped substrate 10 is composed of a material such as a polymeric material (e.g. poly methyl methacrylate (PMMA) ).

Substrate 10 is coated with a film 11 with a High Optical Index of Refraction (referred to hereinafter as an "HOIR"), such as silicon, or a very thin energy absorbing material such as Ti, Cr, Au, Pt or Pd. Preferably this film 11 is on the order of 30 nm or less in thickness, so that it couples light efficiently into the structure without causing a loss of light due to absorption in the film 11. This layer provides a partial optical mirror at this level which permits light to be partially reflected from the interface between substrate 10 and film 11 so that the servo markings 14 described below can be detected optically, with light shone from below the medium 10, as described below.

A dielectric spacer film 12 is applied to the upper surface of the thin film 11 (of absorbing or HOIR material). The dielectric film 12 is preferably about 20 to 200 nm thick.

Figure 2:
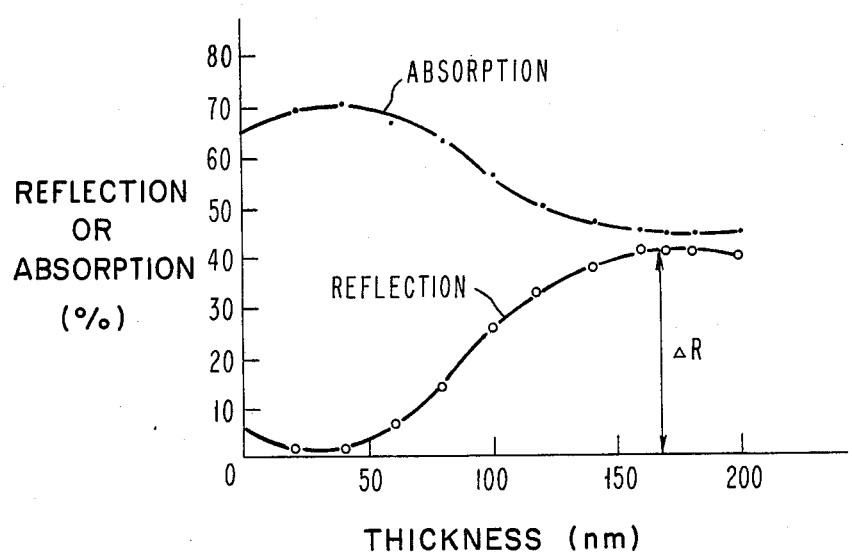
FIG. 2 is a graph of the percentage of reflectivity and absorption as a function of the thickness of an intermediate layer of polymeric material in the structure of FIG. 1.

FIG. 2 is a graph of the percentage of reflectivity and absorption as a function of the thickness of an intermediate layer of polymeric material in the structure of FIG. 1 (for a fixed thickness of layers 11 and 13 of FIG. 1.) FIG. 2 shows the relevant range of thicknesses for the dielectric spacer film 12.

An optically absorbing film 13 in which the deformations in the form of bubbles, vesicles, or holes 15 are formed lies on top of spacer film layer 12.

Substrate 10 contains a pattern of buried pits 14 on its upper surface which are pre-formed to provide position indicators in the form of buried undulations along a servo track on the substrate 10. A conformal, very thin film 11 of HOIR or metallic material is formed on the patterned disk 10. Next, an appropriate polymeric or dielectric film 12 is coated onto the film 11 by coating with a liquid such as a solvent carrying the coating material in liquid form. As the polymeric film 12 is applied to the top surface of film 11, the spaces above the pits 14 on the surface of film 11 are filled with the the polymeric film 12, which forms a smoothing layer. Thus, the resultant top surface of the polymeric material 12 is substantially flat, i.e. the surface of layer 12 above the pits 14 is almost coplanar with the remainder of the surface area of the layer 12. Finally, the top surface of the polymeric film 12 is coated with a thin optically absorbing film 13 (such as a metallic film.) When heated intensely, film 13 cooperates with the film 12 to form the desired bubbles 15 (referred to here as vesicles or holes.)

An appropriate source of intense heat for forming the holes or vesicles 15 is a focussed laser beam or other concentrated source of radiation. The vesicles 15 are referred to as vesicles in the sense that they are blisters formed in the thin film layer 13 on the surface of the disk 9. A blister 15 forms as the result of heating both layers 12 and 13 in the location where a blister 15 is to be produced so that gases evolve from layer 12. The expansion of the gases which escape produces pressure which pushes layer 12 up into a blister or vesicular formation 15.

READING PHASE INFORMATION

The phase information represented by pits 14 is intended to be read through the substrate 10 by a laser beam 16 directed up through the bottom of disk 9. The phase information can be detected optically because of a change in optical reflectivity at the interface between the substrate 10 and the first layer 11. It is for that reason that layer 11 is chosen to act as a partial mirror.

READING DATA

In addition, the data stored on medium 9 is written in the form of numerous vesicles or holes 15 on the top surface 17 of the storage medium 9. The data is read optically also by directing light through the substrate 10 and onto the surface 17 of the medium 9. Data written in the form of vesicles is read by sensing the increase in reflectance as measured from the substrate side, caused by a detuning of the optical cavity comprising films 11, 12 and 13 due to the blister in the film 13. Data written in the form of holes is read by sensing the increase in reflectance seen from the substrate side caused by the destruction of the tuned optically absorbing trilayer. The data is read by measuring the optical phase and amplitude changes caused by the displacement of the top metallic film 13.

The change in optical reflectivity of the composite structure (for light directed through the substrate upon surface 17) is due to variations in the effective thickness of the layers 11 and 12 due to the blister. In the absence of data recorded as vesicles 15, the multilayer structure 19 (comprising the thin layer 11, the dielectric layer 12 and the absorbing layer 13) forms a selective optical absorber. The wavelength of maximum absorption of optical energy depends critically upon the thicknesses of both layers 11 and 12 which, together, serve as a spacer layer. The optical thicknesses of layers 11 and 12 are adjusted to minimize the total optical reflectivity of light directed through substrate 10. This is accomplished by adjusting the thicknesses such that light reflected from layer 11 is nearly out of phase with light reflected from layer 13, once it has propagated back to the interface between the layer 11 and the substrate 10. The total optical thickness of layers 11 and 12 in the regions where data is to be recorded, will typically be adjusted to about one-quarter wavelength (or an odd multiple of one-quarter wavelength) in order to minimize the net reflectance.

Variations in the thickness of the layer 12 due to undulations 14 in the substrate 10 will causes variations in optical reflectivity at the wavelength of the optical beam used to detect the servo track information.

FIG. 2 shows calculated plots of the percentage of reflection and absorption of light directed onto the structure shown in FIG. 1 as a function of the thickness of the polymeric film 12. The light from laser beam 16 is directed through the back of disk 9 through substrate 10 onto the interface between substrate 10 and layer 11. The reflections from that interface affected by the pattern formed by the pits 14. That pattern of pits 14 is coated with the three layer absorbing structure 19 comprising the thin film reflecting layer 11, the dielectric layer 12, and the absorbing film 13.

Delta R is the variation in the reflection percentage shown in FIG. 2 from a minimum value of reflectivity found between the pits 14, to the maximum value where the thickness of film 12 is greatest, which is in the regions above the pits 14. FIG. 2 shows a specific example of a calculated result for a structure of the variety shown in FIG. 1 where layer 11 is composed of silicon 15 nm thick, which is an HOIR material, and metallic absorber layer 13 is composed of Ti 15 nm thick. The reflectivity (overall) and absorption were calculated as a function of the thickness of the polymeric intermediate film 12. The reflectivity varies from almost zero to 40% as the thickness of the polymeric film 12 increases from 40 to 180 nm. Thus, if the original substrate 10 contains pits which are only 140 nm deep, then the phase information can be read easily. The ease is attributable to the thickness of film 12 which affects the reflectivity of the composite structure which is changed by the presence of a pit 14.

The optical absorption, which represents the energy coupled into absorbing film 13 during the writing process, varies from 70% to 40% depending upon the thickness of the polymeric film 12. The most sensitive writing positions on the medium 9 (at which the optical absorption in the film 13 is the highest) are in the areas on the surface 17 of film 13 between the pits 14.

Difficulties can be experienced in fabrication of the relatively thin polymeric layer 12. Maintaining its upper surface (in contact with film 13) level or flat as indicated in FIG. 1 while accurately controlling the thickness is difficult.

It is necessary that in spite of the thinness of layer 12 that the manufacture should be performed in such a way that the surface of the resulting film 12 is relatively flat. After film 12 is applied very little of the contour of the pits 14 below (or grooves) in the surface of the substrate 10 and the film 11 should show through to the upper surface of film 12, which is employed as a smoothing and a dielectric layer. This problem of maintaining smoothness of film 12 is minimized by increasing the overall thickness of the polymeric material in steps of 280 nm (i.e., one-half wavelength assuming an 840 nm laser and by specifying an index of refraction of 1.5 for the polymer). Fabrication of the thicker films of the higher order structure is easier than the thinner films, when conventional fabrication techniques of spin coating or casting from a solution are utilized. However, thickness above 5/4 of a wavelength should be avoided due to (1) critical thickness control and (2) loss of coupling due to the effects of light that is not normally incident to the structure.

EXAMPLE

The above concepts have been reduced to practice by fabricating a batch of samples on PMMA substrates 10 with the following structures:

Substrate 10: Composed of PMMA is 1.1 mm thick and transparent.

First layer 11: Amorphous Si film is deposited by sputtering silicon 10 nm thick, in argon gas, at a pressure of 2.0 Torr and at 25 degrees C.

Second layer 12: This layer is composed of Poly Alpha Methyl Styrene (PAMS) polymeric film with several different samples having thicknesses of 236 nm, 260 nm, and 290 nm respectively. This layer is formed by casting from a solvent, in which the polymer is dissolved.

Top layer 13: NiCrFe film 20 nm thick, deposited by sputtering in argon gas at 2.0 Torr pressure, and 25 degrees C. Layer 13 is continuous and mechanically strong, so that vesicles 15 can be formed in layer 13 by gas liberated from the dielectric layer 12 below layer 13.

Figure 3:
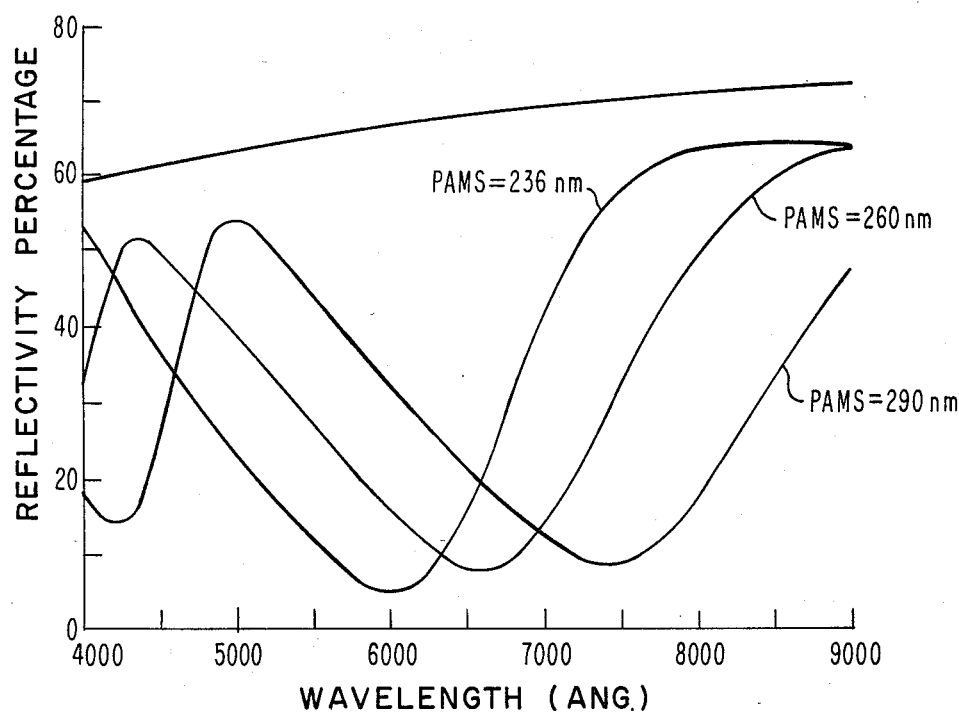
FIG. 3 shows a graph of several experimental curves of the percentage of reflectivity of the composite medium as a function of wavelength for several different thickness of polymeric film.

FIG. 3 is a plot of the percentage of reflectivity of the samples described in the above example as a function of the wavelength of the light in Angstroms.

The curve A is for the reflectivity of NiCrFe layer 13 as measured for normal incidence of light upon surface 17 when light is shining down upon it from above. The lower three curves are measured for a beam 16 directed from below the substrate 10 onto surface 18 of the structure. As the thickness of the polymeric film 12 increases the minimum of the reflectance curve shifts towards the longer wavelengths. A structure for an optimized 840 nm wavelength may be fabricated with layer 12 composed of a PAMS polymeric film having a thickness of 320 nm yielding a total reflectivity value of about 10%. Thus an optical efficiency of greater than 70% is provided for absorption of light in the NiCrFe layer 13.

What is claimed is:

1. An optical storage medium comprising
an optically transparent substrate carrying a thin film structure comprising a data storage material adapted to form deformations representing data formed in said thin film structure of data storage material,
said medium including a servo track formed at an interface between said substrate and said structure,
said servo track comprising internal mechanical undulations of the surface of said interface,
said surface of said interface being coated with a first thin film having a high optical index of refraction and having a thickness on the order of less than or equal to 30 nm,
said mechanical undulations being substantially absent from said surface of said thin film structure in which said deformations are formed,
whereby said servo data can be read through said substrate without said servo data substantially affecting the optical image of said deformations on the upper surface of said thin film structure.

2. A medium in accordance with claim 1 wherein
said substrate is coated with a first film having a high optical index of refraction,
said first film being coated with a polymeric film,
said polymeric film being coated with said data storage layer.

3. A medium in accordance with claim 2 wherein said data storage material (13) comprises a metallic film.

4. A medium in accordance with claim 3 wherein said polymeric film comprises a spacer layer which substantially fills the depressions in said surface of said interface formed by said mechanical undulations (14) of said surface of said interface.

5. A medium in accordance with claim 4 wherein said polymeric film comprises a dielectric layer.

6. A medium in accordance with claim 2 wherein said polymeric film (12) substantially fills the depressions in said surface of said interface formed by said mechanical undulations (14) of said surface of said interface.

7. An optical storage medium comprising an optically transparent substrate carrying a thin film layer (13) of optically absorbing material with deformations (15) representing data formed in said thin film layer(13),
said medium including
a substrate (10), said substrate being coated with laminated films (19),
said laminated films (19) including
a conformal thin film (11) having a high optical index of refraction and having a thickness on the order of less than or equal to 30 nm,
a dielectric film (12) and
a thin film layer (13) of said absorbing material adapted for forming said deformations (15) between said thin film layer (13) of said absorbing material and said dielectric film (12),
said medium including a servo track,
said servo track comprising a plurality of mechanical undulations (14) of the surface of said substrate at the interface between said substrate (10) and said laminated films (19), and
said mechanical undulations (14) being substantially absent from the surface (17) on which said deformations (15) are formed,
whereby said servo data can be read through said substrate (10) without affecting the optical image of said deformations (15) on the upper surface of said thin film layer (13).

8. A medium in accordance with claim 7 wherein
said substrate (10) is coated with said conformal thin film (11) which has a high optical index of refraction,
said conformal thin film being coated in turn with said dielectric film comprising a polymeric film (12), and
said polymeric film being coated in turn with said thin film layer comprising a metallic film (13).

9. A medium in accordance with claim 8 wherein said polymeric film (12) comprises a spacer layer which substantially fills the depressions formed by said mechanical undulations (14).

10. A medium in accordance with claim 9 wherein said polymeric film (12) comprises a dielectric layer.

11. A medium in accordance with claim 7 wherein said polymeric film (12) substantially fills the depressions formed by said mechanical undulations (14).

12. A medium in accordance with claim 7 wherein said substrate (10) is coated with a very thin film (11) less than or equal to about 30 nm thick, said very thin film being coated in turn with a layer of said polymeric film (12) having a thickness within the range between about 20 and 200 nm, said polymeric film being coated in turn with said thin film layer (13) of an optically absorbing metallic film.

13. An optical storage medium including
a substrate (10) carrying an optical storage trilayer configuration (19) having a high degree of optical efficiency, and including
an optically absorbing active layer (13),
with said optically absorbing active layer (13) of said optical storage medium being at a free surface, and
said substrate (10) acting as a protective cover glass, and
a series of layers (11,12,13) included in said trilayer configuration (19) including a high index of refraction material in one layer (11), less than or equal to about 30 nm thick, a dielectric layer (12) and an active layer (13),
with said dielectric layer (12) interposed between said substrate (10) and said active layer (13).

14. An optical storage medium comprising
an optically transparent substrate carrying a thin film structure comprising a data storage layer of material adapted to form deformations representing data formed in said thin film structure of data storage material,
said medium including a servo track formed at an interface between said substrate and said structure,
said servo track comprising internal mechanical undulations of the surface of said interface,
said mechanical undulations being substantially absent from said surface of said thin film structure in which said deformations are formed,
said substrate being coated with a first thin film (11) having a high optical index of refraction having a thickness on the order of less than or equal to 30 nm and said first thin film (11) being composed of a material consisting essentially of at least one element selected from the group consisting of silicon, Ti, Cr, Au, Pt and Pd for providing a partial optical mirror for said undulations of said servo track,
said first film being coated with a polymeric film (12),
said polymeric film being coated with said data storage layer,
whereby said servo data can be read through said substrate without said servo data substantially affecting the optical image of said deformations on the upper surface of said thin film structure.

* * * * *